Dec. 2, 1941.   T. H. WOLFE   2,265,094
WRIST MIRROR
Filed July 19, 1939
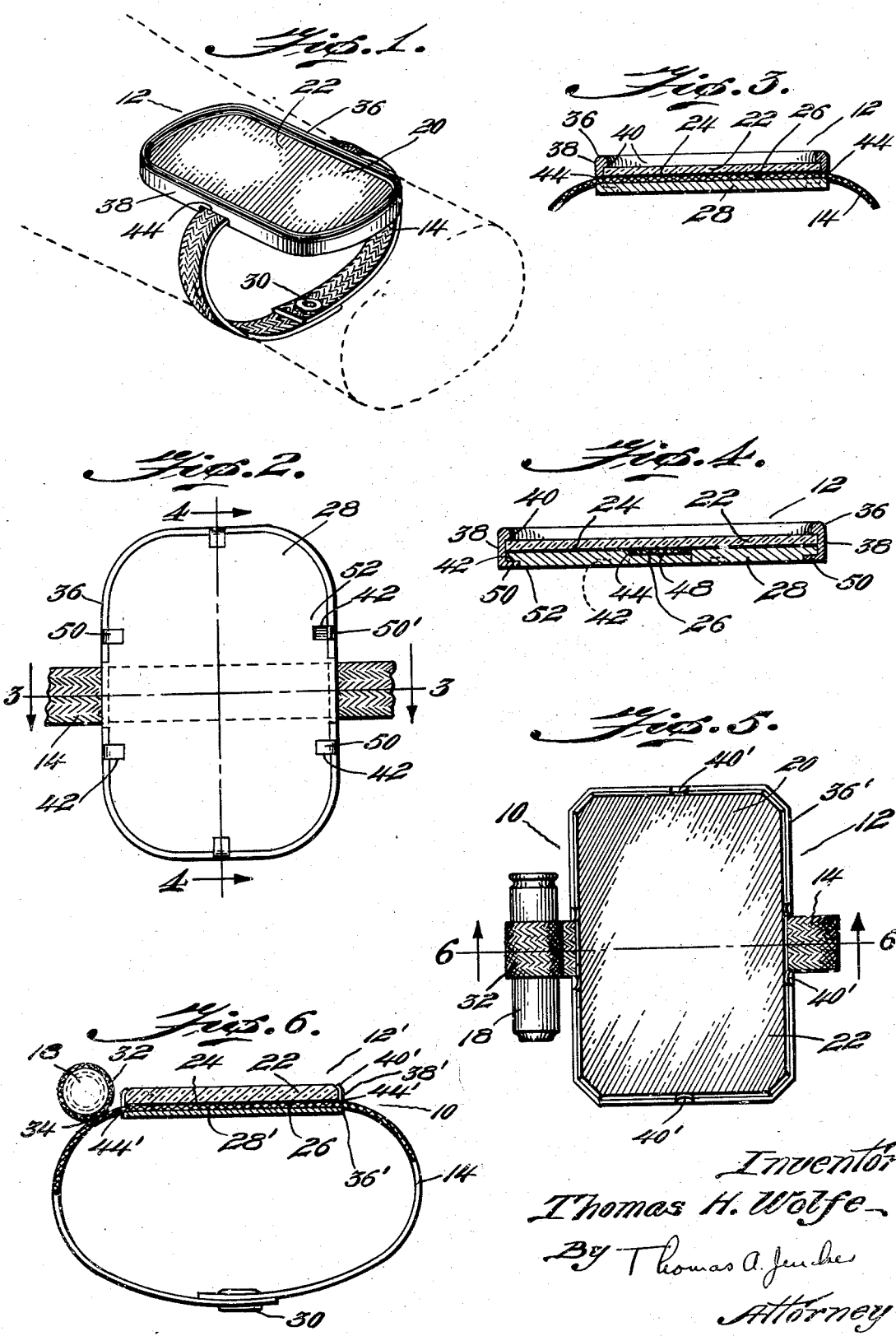

Patented Dec. 2, 1941

2,265,094

UNITED STATES PATENT OFFICE 2,265,094

WRIST MIRROR

Thomas H. Wolfe, Warwick, R. I.

Application July 19, 1939, Serial No. 285,386

1 Claim. (Cl. 224—28)

My invention relates to improvements in wrist mirrors, particularly the type adapted to be worn on the wrist for use in applying cosmetics, particularly lipstick or rouge to the wearer's face, and one embodiment of my invention comprises a complete apparatus for use in applying lipstick, including said mirror, a strap for holding said mirror on the wearer's wrist and a lipstick also carried by said strap.

I am aware that others have attached vanity cases to a wearer's wrist but these have proved cumbersome in use and have of necessity had to be of such a size as to be irksome to the wearer and have been so large that they have tended to obstruct the desired free movement of the wearer's arm as well as looking somewhat unsightly.

An object of my invention, therefore, is to provide a device which may be worn on the wearer's wrist and which can, if desired, be readily concealed by the wearer's sleeve to provide a ready apparatus for the application of lipstick.

I am also aware that wrist mirrors have been provided for signaling to a passing motorist. So far as I am aware, however, these have been of a relatively large type and not at all suited for use as a compact easily concealed device for use in applying lipstick or cosmetics by the wearer.

Further features of my invention relate to improvements in the specific construction of my improved apparatus, particularly in the construction of the wrist mirror itself and the means I preferably employ for the attachment of the wrist strap thereto so that the wrist mirror will be securably clamped to the strap and not tend to move circumferentially of the strap and wrist.

These and such other objects of my invention as may hereinafter appear may be best understood from a description of the accompanying drawing which illustrates various embodiments thereof.

In the drawing, Fig. 1 is a perspective view of an embodiment of my invention attached to a wrist, the wrist being indicated in dotted lines.

Fig. 2 is a reverse plan view of the wrist mirror and adjacent strap portion.

Fig. 3 is a transverse sectional view taken along the line 3—3 of Fig. 2.

Fig. 4 is a longitudinal sectional view taken along the line 4—4 of Fig. 2.

Fig. 5 is a plan view of an alternative embodiment of my invention having a lipstick mounted on the mirror strap thereof.

Fig. 6 is a transverse sectional view taken along the line 6—6 of Fig. 5.

In the drawing, wherein like characters of reference indicate like parts throughout, 10 generally indicates an apparatus for use in applying lipstick constructed in accordance with my invention. The wrist mirror thereof is generally indicated as 12. The strap means 14 secured thereto is detachable, securing the same on a wearer's wrist as shown in dotted lines in Fig. 1. In the preferred embodiment of my invention, shown in Figs. 5 and 6, said apparatus, in addition to the wrist mirror 12' and strap means 14, includes a lipstick holder 18 also mounted on said strap means 14. While any type of a mirror plate 20, metal or otherwise, having a smooth reflecting surface may be employed, I preferably employ a glass mirror of standard type, comprising a transparent plate 22, constructed of glass, transparent synthetic resin or any other suitable transparent material having an opaque silvered reflecting coating 24 on the lower surface thereof. It is obvious that by employing this standard type of a mirror plate 20, the opaque silvered coating 24 performs the double function of not only providing a light reflecting coating on the lower surface of the transparent plate making up the mirror plate, but said coating 24 being also opaque also conceals the portion of the strap 26 of said strap means 14 and the mirror frame backing portion 28 immediately below it. The detachable strap means may be constructed of any suitable material and may comprise a metal chain or be constructed of solid flat stock, or other metal material, of heavy brass, gold, silver or any suitable metal or material, or it may be constructed of leather, fabric, or as shown, of a suitable elastic rubber fabric material and may, if desired, be provided with detachable means to permit its ready removal from the wrist, such as the separable fastener 30 shown in the drawing, for use in attaching the elastic fabric strap 14 shown to the wearer's wrist. As stated, a portion 26 of said strap means 14 is adapted to underlie the lower surface of the mirror plate 20.

In my preferred embodiment, shown in Figs. 5 and 6, said strap means also has a portion 32 thereof shaped to detachably mount a lipstick or lipstick holder 18 thereon adjacent the transparent mirror plate 20, in my preferred embodiment comprising a loop 32 in said strap 14 secured thereto by the stitching 34. The wrist mirror 12 also includes a mirror frame 36 having the backing portion 28 adapted to immediately underlie said mirror plate 22 and said strap portion 26, said mirror frame 36 being so constructed as to firmly clamp said strap portion 26 between said mirror plate 22 and mirror backing portion 28, securing said mirror plate 22 within the frame. In the embodiment shown, the mirror frame 36 includes the vertical wall portion 38, comprising a continuous vertical wall substantially surrounding the edges of said plate. Said mirror frame 36 also includes a portion 40 adapted to overlie the outer portions of the top surface of said mirror plate 22. The mirror frame 36 can be made of any suitable material, such as pressed metal, or of suitable plastic material, such as Celluloid, suitable cellulose product, suitable synthetic resin composition, rubber, etc.

In the embodiment of my invention shown in Figs. 1-4 the flat backing portion 28 adapted to underlie the mirror plate 22 and the strap portion 26 has the spaced grooves 42 on the lower surface thereof extending inwardly from the outer edge of the wall thereof, in the embodiment shown having a rectangular shape. In this embodiment the continuous vertical wall portion has the upper edge 40 thereof continuously bent inwardly to abut and overlie said mirror plate 22. Said wall portion also has the longitudinally aligned slots 44 in the lower portions of the walls thereof for securing said strap portion therein. In this embodiment, as shown in Fig. 4, the upper surface of said backing portion 28 is provided with a depressed transverse channel 48 for receiving said strap portion 26 therein. In this embodiment the lower end of said vertical wall portion 38 is also provided with the spaced lugs 50 therein similarly spaced to the grooves 42 projecting integrally inwardly from the lower end thereof resting in said grooves 42 to form a smooth flush bottom surface 52 for said mirror frame 36 and clamping said mirror plate 22 against said inwardly bent wall edge 40 and the portion 26 of said strap means 14 between said slots 44 between said mirror plate 22 and said backing portion 28. It is obvious that in place of said lugs 50 registering in the grooves 42, that any other suitable type of means may be provided to secure said backing portion 28 to said side wall portion 38, clamping said mirror frame 22 against the inwardly projecting upper edge 40 of said frame portion 38. Employing the lug construction, however, if it be desired to replace the strap, it is obvious that the lugs 50 may be bent to a substantially vertical position, as shown by the lug 50' in Fig. 2 and the backing portion 28 readily removed from the vertical wall frame portion 38 and that in the initial assembly thereof all said lugs 50 project vertically downwardly like the lug 50' and may be readily bent inwardly to compactly lie within said grooves 42 to form said flush surface 52 and to clamp said mirror plate 22 and strap portion 26 to said mirror frame 36.

In the embodiment of my invention, shown in Figs. 5 and 6, the vertical wall portion 38' is constructed integrally with the backing portion 28', and said vertical wall portion 38' is also provided with the aligned slots 44' in the lower portion of the wall 38' thereof for receiving said strap portion 26 therein. To secure said mirror plate 22 to said mirror frame, upper portions 40' of the vertical wall portion 38' are suitably bezeled over said mirror plate 22 to clamp said mirror plate against said backing portion 28' and the portion 26 of said strap means between said slots 44' between said mirror plate 22 and backing portion 28'. If desired, the entire upper portion of the vertical wall 38' may be bezeled over for this purpose, as shown, or I may, if desired, provide the supplemental lugs 40' projecting further upwardly therefrom at spaced intervals suitably bezeled over the upper edge of said mirror plate 22.

It is obvious that when attached to the wearer's wrist, my improved wrist mirror is constructed of such a small number of simple parts that it may be readily worn by the wearer in an inconspicuous position and may be concealed by the sleeve, if desired, and yet may be readily moved by bringing the arm into the line of the wearer's vision to provide a quickly accessible reflecting surface for the application of lipstick or other cosmetics to the wearer's face. It is also apparent that in my improved embodiment shown in Figs. 5 and 6, a lipstick 18 or other cosmetic is supplementally carried in a convenient position adjacent said wrist mirror for the ready use thereof.

It is apparent that I have provided a novel type of apparatus for use in applying lipstick, including a novel type of wrist mirror with the advantages explained above.

It is understood that my invention is not limited to the specific embodiments shown and that various deviations may be made therefrom without departing from the spirit and scope of the appended claim.

What I claim is:

A wrist mirror, comprising, in combination, a transparent fragile plate having an opaque silvered reflecting coating on the lower surface thereof, detachable strap means adapted to surround a wearer's wrist having a portion underlying said lower surface and a mirror frame having a backing portion adapted to underlie said transparent plate and strap portion, and an upper portion detachably securable over the edge of said transparent plate to firmly clamp said strap portion between said transparent plate and mirror backing portion securing said transparent plate within said frame with said fragile transparent plate abutting said strap portion to supplementally function as a retaining member therefor to positively prevent any movement of said wrist mirror axially of said strap means.

THOMAS H. WOLFE.